Patented Mar. 11, 1947

2,417,058

UNITED STATES PATENT OFFICE 2,417,058

ROOFING GRANULES AND METHOD OF PRODUCING THE SAME

Maurice E. Buzzell, Mahtomedi, and George W. Swenson, St. Paul, Minn., assignors to Minnesota Mining & Manufacturing Company, St. Paul, Minn., a corporation of Delaware No Drawing. Application February 14, 1942, Serial No. 430,928

18 Claims. (Cl. 117—100)

This invention concerns improvements in the manufacturing of artificially colored granules and more particularly artificially colored roofing granules intended for use in the decoration and protection of asphalt roofing, siding or the like.

Processes have long been known for the coloring of roofing granules in which the granules are colored with a coating containing pigment and sodium silicate. In carrying out these processes granules are mixed with pigment and a sodium silicate solution until suitable coating is obtained. The coated granules are then dried. Many investigators have tried adding reactants to the silicate solution in attempts to render the silicate insoluble and weatherproof but these attempts have been largely unsuccessful and most of these granules have not been acceptable commercially. Colored granules produced by these methods have in the past been largely of inferior resistance to weathering, of poor color, and have faded rapidly. They have usually been quite porous, causing blistering of the asphalt roofing. Organic bonds of the ordinary drying oil paint type were once used and though brilliant colors have been thus produced, these colors have not been weatherproof and have faded badly. For many years pigmented organic bonds have been carefully avoided altogether by the roofing industry, where permanence of color is an important requirement.

Phosphate cement coatings have also been used, but here again the granule colors have not been permanent and frequently the granules have faded rapidly. Ceramic or fused colored coatings have been applied to roofing granules and coatings within that class have been developed which have proven to be weather resistant and permanent but the choice of pigments in such coatings has been somewhat limited since coatings of this type must be fired above approximately 1000° F., and sometimes in the range of 1600°–2100° F. By limiting the choice of pigments to that group which will withstand such substantial elevated temperatures, many otherwise satisfactory pigments have been passed over as unusable. Since the beginning of the use of artificially colored granules for the decoration and protection of asphalt roofing, experimenters have tried to find a group of pigments and a method of bonding them which would give strong brilliant colors which are fast to light and in all ways permanent and weatherproof, on the one hand, while at the same time providing a bond for such pigments or colors which is dense, durable and weatherproof, and which will not deleteriously affect such pigments, either during the coating operation or afterwards.

Among the important objects of the present invention are the following:

(1) The production of an artificially colored roofing granule of high chroma (i. e. high color strength) which is lightfast and resistant to natural weathering;

(2) The production of a weather resistant inorganic bond which can be used with heat sensitive pigments (3) The production of a roofing granule having a high degree of dispersion or coating of the pigment beyond that obtained by ordinary methods;

(4) The production of an artificially colored roofing granule having an extremely dense inorganic cement coating, thereby making the granule substantially free from porosity; and (5) The production of a colored coated roofing granule which is resistant to blooming.

The above, as well as other objects and advantages, will be seen from the description of the invention taken as a whole, including the appended claims. When coated as herein illustrated, the finished colored coated granules are substantially non-porous, and are highly satisfactory in respect to freedom from blistering, staining and sooting difficulties.

In the production of roofing granules it has been customary to use only inorganic pigments. No organic pigment was heretofore recognized which was sufficiently light-fast for use in coloring roofing granules. Organic pigments have also been passed over because of their extreme sensitivity to heat which causes them to disintegrate or char when heated in an inorganic bond. The prior art also associated other disadvantages with organic pigments in general.

We have discovered, however, how to produce a colored coated granule which is weather-resistant and substantially non-blooming and non-porous, and which is otherwise suitable and advantageous as a roofing granule, in which an organic pigment is used. Phthalocyanine pigments have been employed successfully by us, bonded to the surfaces of the base granules by an inorganic matrix. The inorganic matrix or coating and method of producing the same, though having special utility in connection with organic pigments such as just illustrated, also have a broader scope of usefulness, including those cases where the pigment or coloring agent is largely or completely of inorganic nature.

We have found that phthalocyanine pigments or coloring agents have sufficient resistance to light, and are satisfactory for outdoor exposure when applied as herein described. We have also discovered how to bond these pigments to surfaces of base granules so as to secure a weather-resisting matrix as binder for the pigment while, at the same time, avoiding high superatmospheric temperatures and other conditions which would injure or destroy the phthalocyanines. We are able, accordingly, to produce colored coated granules which are strong in color and which have brilliant shades of color.

However, under many conditions, phthalocyanines may be unsatisfactory when used alone, and their use thus discouraged. This seems to be explainable on the basis that phthalocyanines, although strong of themselves, appear to be so transparent when used alone as a pigmenting material on base granules of gray or greenish gray color, for example, that the resulting colored, surface-coated granules are dark and unattractive. We have found that we can overcome this difficulty and make phthalocyanines highly useful in producing such colored coatings by employing a finely divided relatively opaque material or pigment along with the phthalocyanine pigment. For example, we have found that we can produce very satisfactory blue colored, surface-coated roofing granules by the combined use of phthalocyanine blue and ultramarine blue. Such a combination of colors is more satisfactory than phthalocyanine blue alone, for the reasons just indicated; such combination is also stronger in color and more resistant to color deterioration by atmospheric acids than is the ultramarine alone. The combination of the two pigments, therefore, gives a more advantageous result than either pigment alone.

It will be understood that the ultramarine blue pigment is simply one example of a number of finely divided materials which may be used along with phthalocyanine blue in producing blue-colored, surface-coated roofing granules. Another example is titanium oxide. Zinc oxide may also be used but, in general, appears less satisfactory than titanium oxide.

Other colors in surface-coated granules may also be produced advantageously according to the above principles. For example, highly satisfactory green colored coated granules can be produced by the use of a combination of phthalocyanine green and chromium oxide. Whereas the phthalocyanine green alone is unsuited for roofing granules under commercial standards and requirements, or at least leads to relatively inferior results from a color point of view, on the other hand, brilliant effects are obtained when it is used with chromium oxide even in small quantities. Here again the combination of the two pigments gives a much more satisfactory result than either alone. Examples of other finely divided materials which may be used with phthalocyanine green in place of chrome oxide pigment are titanium oxide, and even zinc oxide, or white lead, although the latter, in this case as in the preceding illustrations, appears less satisfactory in general than titanium oxide.

It is to be observed that in neither of the above cases is the improvement in color as above described, the result of a modification of hue such as is ordinarily obtained when blending or combining pigments, but rather it is a new effect making possible the use of a class of pigments, especially phthalocyanines, which was hitherto unsuited for use in coloring mineral roofing granules.

We further have found that in the use of phthalocyanine pigments the color and coating is much improved if a very small amount of titanium oxide, for example, one to five pounds per ton of granules, is added (even where ultramarine blue or the like or chromium oxide or the like, as the case may be, is used) for the purpose of giving an opaque character to the coating which will assist in bringing out the full color strength of the phthalocyanine pigments. Various other pigments are finely divided materials having high refractive indices, such as those already indicated, are well adapted for this purpose.

Phthalocyanine pigments can be obtained either as dry powder or as pastes in water having a solid concentration of about 20%. We have found that the use of a paste will result in about twice the color efficiency of the dry powder for our purpose and under the conditions herein illustrated. In the paste the individual pigment particles have never been allowed to dry and agglomerate and, accordingly, appear to be therefore free to extend themselves much farther in our coating process, thereby improving and enhancing the color of the finished coated granules for a given consumption of phthalocyanine.

As a base granule we have found that we are able to use any of a rather wide class of relatively porous or relatively non-porous and weather-resistant rocks or minerals of nature, that is, dense lithic material. Examples of relatively porous material are trap rocks and slates. Examples of relatively non-porous rocks or minerals are argillite or greystone (such as the large greystone deposits located about 5 miles north of Wausau, Wisconsin), greenstone, quartz or quartzite, certain granites, etc. Normally it is preferred to employ the relatively non-porous rocks, although even these have a substantial porosity as compared with our finished coatings; for example, in measuring porosity by the oil absorption test, greystone may show an oil-absorption of about 15 lbs. per ton of greystone granules (uncoated), whereas, after coating according to the present invention, the same granules will then show an oil-absorption of only about 5 lbs. per ton.

Of greatest value, other factors being equal, are mineral granules which are opaque, or relatively opaque, to ultra-violet light and of a light neutral grey color. Such a material base will yield colored coated granules having brilliant colors and having highly satisfactory properties generally.

In carrying out our preferred process for making colored roofing granules, the natural mineral which has been previously crushed and screened to the desired size (e. g. so as to pass a "10-mesh" screen and be retained on a "35-mesh" screen) is heated to a temperature above 90° F. but below 130° F., preferably about 110° F., and mixed with the coating chemicals in a suitable mixer such as an ordinary concrete mixer, dried with minimum agitation as for example in a rotary kiln at a temperature above 250° F. but below 600° F., preferably about 400° F., and then cooled. The cooled mineral may then be treated with a paraffin oil, linseed oil, or any other granule treatment known to the roofing art, such as that disclosed in C. L. Jewett U. S. Patent No. 2,164,329.

The following preferred formulas have been employed for the production of blue and green colored surface-coated roofing granules:

*Formula No. 1—Blue*

| | Pounds |
|---|---|
| Granules | 2,000 |
| Ultramarine blue | 15.0 |
| Blue phthalocyanine paste (20% solids) | 1.2 |
| Titanium oxide | 2.0 |
| Aluminum fluoride | 11.4 |
| White Portland cement | 4.0 |
| Sodium silicofluoride | 5.7 |
| Sodium silicate solution (ratio of silicate to soda 2.85) | 50.0 |

*Formula No. 2—Green*

| | Pounds |
|---|---|
| Granules | 2,000 |
| Chromium oxide | 6.0 |
| Green phthalocyanine paste (20% solids) | 2.4 |
| Iron yellow | 0.1 |
| Titanium oxide | 1.0 |
| Aluminum fluoride | 11.4 |
| White Portland cement | 4.0 |
| Sodium silicofluoride | 5.7 |
| Sodium silicate solution (silica to soda ratio 2.85) | 50.0 |

In coloring one ton of blue granules according to the above formula we have found the following procedure to be most satisfactory. The granules and pigments (or pigment plus finely divided opaque material), for example, blue ultramarine, blue phthalocyanine and titanium oxide, are placed in a mixer, together with the sodium silicate solution and mixed for about one to two minutes. During this mixing period the granules should be maintained at a temperature of about 110° F. to facilitate mixing and promote the subsequent reaction of the sodium silicate with the reactants. In the event the granules are more porous than usual, or dusty, it may be necessary to add a small amount of water to the silicate solution in the original mix. The mixer employed may be any of the usual conical or barrel type mixers such as used for concrete. After the preliminary mixing, the aluminum fluoride and white Portland cement, previously mixed together, are added to the mixer and allowed to mix for about 3 minutes, after which the remaining reactant, namely, the potassium or sodium silicofluoride, is added uniformly to the mixer and mixing is continued for an additional two to four minutes. The granules are then immediately dropped into a suitable bin or receptacle from which they are fed into the kiln or dryer. In drying the granules it is extremely important that they be dried with the least possible amount of agitation in order to produce a film on the surface which is dense and strong. In the event the film of silicate is unduly disturbed during drying a light dusty powdered coating will result. We have found that the installation of lifter flights which lift the wet granules up to the top of the kiln and drop them through the kiln gases will produce granules having a dense and non-porous surface coating. Drying appears to take place so rapidly that the structure of the coating is not disturbed to any substantial extent and carbon dioxide is not absorbed from the kiln gases. The resultant granules, being non-porous, are remarkably free from any tendency to absorb moisture or to cause blistering of asphalt roofing and have been found to be unusually water-insoluble and weather-resistant and also bloom-resistant.

The aforementioned lifter flights may take the form of angle irons welded to the inside periphery of the rotary kiln and extending longitudinally thereof. These angle irons pick up granules and, as the kiln rotates, they are carried up to the top of the kiln and are gradually spilled out, providing the desired contact with the hot gases of the kiln without unduly disturbing the granule coatings. The angle irons or equivalent may be arranged helically, instead of longitudinally, where desired. This is often done at the feed end of the kiln so as to speed up the longitudinal movement of the granules along that section of the kiln. The granules progress through the kiln countercurrent to the kiln gases. The gases may be other than flue gases where desired, and may be substantially free of carbon dioxide. For example, the gases may be hot air.

In general, it has been found that the method of processing coatings of this type is more critical and important than the exact proportion of chemicals used in the coating material. This does not mean that reactants can be added or subtracted indiscriminately but rather that, unless the mixing and drying are carried out generally in accordance with the instructions given hereinabove, a very unsatisfactory granule coating may be obtained, even though the exact formulas shown above are used.

It will be observed by those skilled in the art that we have specified a sodium silicate having a silica ($SiO_2$) to soda ($Na_2O$) ratio of 2.85, whereas the literature covering the roofing granule art deals almost exclusively with silicates of a $SiO_2$ to $Na_2O$ ratio of 3.22. There are several important reasons for this change among which is the very definite improvement in coating and color development obtained with the use of the more alkaline silicate. In addition, the acid reaction of sodium silicofluoride and/or the aluminum fluoride will set up the more acid silicate so rapidly that there is a much increased tendency for a dusty, light colored coating to be obtained. In general, the more acid (or less alkaline) the silicate, the smaller the amount of aluminum fluoride and/or sodium silicofluoride which can be satisfactorily used with it. In the process which we have described the aluminum fluoride and the sodium silicofluoride have an acid reaction upon the sodium silicate which substantially reduces the alkalinity of the granule surface and may even leave the granules with a slightly acid surface.

The use of aluminum fluoride with sodium silicofluoride in the above formulae, while not essential, has however proven to be superior to sodium silicofluoride alone in that instead of using just sodium silicofluoride, a better bond of greater resistance to blooming is obtained when a portion of the sodium silicofluoride is replaced by aluminum fluoride. However, it is desirable that the aluminum fluoride employed as a coating ingredient be one containing some water of hydration so as thus to control the aluminum fluoride to a predetermined degree of insolubility, i. e. quite insoluble but not completely insoluble. Barium silicofluoride, as well as the aluminum fluoride, or other comparable fluorides which are also relatively acidic in their actions, can well be substituted for some, or even all, of the sodium silicofluoride; but it is quite important that the reactant for the sodium silicate be relatively insoluble but not too insoluble, i. e. it is desirable that such reactant or reactants have a predetermined degree of insolubility as illustrated by the sodium silicofluoride, aluminum fluoride and barium silicofluoride aforementioned. If under those conditions the granules in the mixer are cold or at less than 60° F., insufficient reaction will take place in the wet mix between the sodium silicate and the sodium silicofluoride, and/or there will be insufficient fluidity in the wet mix, to inhibit blooming of the finished granules to the extent desired.

The Portland cement appears to have a drying action upon the silicate solution and also to react with it, helping to form an insoluble cement coating upon the granules. Other materials such as basic lead carbonate, calcium silicate, and even zinc oxide, and the like, may be used, either alone or as admixtures thereof, in place of some or all of the Portland cement.

We prefer to heat granules so treated to a temperature of about 400° F. during their passage through the rotary kiln or equivalent though satisfactory results have been obtained at temperatures as low as about 250° F. and as high as about 600° F.

For our work we have preferred to use relatively low temperature sodium silicate bonds of the type shown above in coating granules with phthalocyanine pigments. However, certain other types of coating compositions can be used, such as the simple sodium silicate and the phosphate cements shown in the art discussed above, provided the pigment is handled in a manner similar to that shown in the procedure which we specifically illustrate. However, such other types of coating compositions are, in general, less satisfactory.

Hereinabove we have referred to a type or class of organic pigments, especially pigments or coloring matters of the phthalocyanine series. These coloring compounds are of substantially non-oxidizable nature, that is, they can, for example, be recrystallized from concentrated sulfuric acid by diluting the same. Phthalocyanines are derivable (though they are not necessarily derived) from an ortho-dicyano benzene compound. They commonly involve a complex molecular structure in which a plurality of aromatic or benzene ring structures are linked together, e. g. with a nitrogen atom intervening between and forming a linkage between ring carbon atoms of adjacent aromatic ring structures in such complex molecule. The phthalocyanines may or may not have metals, e. g. copper, iron, magnesium, etc., in their molecules, and they may or may not contain substituted groups such as halogens. Organic pigments having molecular structures of like or related type, however designated, are contemplated for use according to this invention.

To illustrate but not to limit types of pigments of the phthalocyanine class, the following disclosures may be noted: Arthur Gilbert Dandridge et al. (British) Specification No. 322,169, of 1929, and Thorpe et al. U. S. Patent No. 2,000,052 (effective filing date of June 22, 1931, issued May 7, 1935). As an example of more recent literature on procedures for making phthalocyanines, Detrick et al. U. S. Patent No. 2,253,560, may be noted. These patents, and various other literature appearing in the application files thereof, discuss and illustrate the chemical nature and molecular structure, and some other characteristics of compounds of this class.

Hereinabove it has been pointed out that one of the outstanding accomplishments of this invention is to provide a colored surface-coating on roofing granules, especially a coating of the unfused or unglazed type, which makes the finished coated granules highly non-porous or, especially, highly non-absorptive. For example it was pointed out that many mineral base granules which are considered quite dense and of relatively low porosity nevertheless have a porosity, as determined by a standard oil absorption test, of, say, 15 lbs. per ton of granules; whereas, after coating according to our invention, such granules, thus coated with an unfused type of coating, will have a much reduced porosity, e. g. 5 lbs. per ton of granules as shown by said oil absorption test. It will be appreciated that this is a very outstanding decrease in absorptivity which is brought about by our unfused type of coatings; and is highly important in respect to the utility of such granules in roofing sheet material. The standard oil absorption test referred to will be briefly described, for the sake of completeness, and is as follows:

*Oil absorption test on granules*

Porous granules or granules with a soft or porous coating show tendencies to blister asphalt roofing and to become stained. These properties, and the resistance to these tendencies, can be measured with fairly good accuracy by the amount of slate oil or the like, which the granules will absorb, according to the following procedure.

*Reagent.*—Slate oil containing an oil soluble dye, Dupont Oil Red will give satisfactory results as a dye. (Various other oil-soluble dyes, especially red or bright colored dyes, can be used.) Make a paste by adding a small amount of slate oil to 10 grams of dye. Put the paste in one liter of slate oil, mix thoroughly and let stand over night. After most of the residue has settled, filter off the clear colored solution which is now ready for use.

The residue can be used again when making more dyed slate oil by mixing in with the new paste.

*Procedure.*—Weigh out 88 g. of thru 14 on 20 mesh granules (viz. through "14-mesh" screen and retained on "20-mesh" screen) when testing the No. 11 grade or 44 g. of thru 8 on 10 and 44 g. of thru 10 on 14 when testing the No. 9 grade, and transfer to a 500 ml. Erlenmeyer flask. In testing raw granules be sure they are dry and reasonably free of dust. Add the colored oil solution a few drops at a time, shaking vigorously after each addition. Test for saturation by placing a piece of filter paper (Whatman #4) over the mouth of the flask and tipping so that the granules rest against the paper for 5 seconds. The formation of a definite stain on the paper indicates the end point which is fairly sharp. The number of ml. of oil used is multiplied by 20 and reported as the "oil absorption." The figure is the number of pounds of oil required to saturate one ton of granules. With a little experience, results should check within .05 ml. or 1.0 lb. per ton.

Part of the oil thus required, e. g. about 3 lbs. per ton of granules, is that needed to wet the surfaces of the granules, as distinguished from that which is actually absorbed. Thus a reduction of oil absorption of, for example, from 20 lbs. per ton to 10 lbs. per ton, according to this test, constitutes a reduction of the porosity or absorptivity by more than 50 percent, e. g. by about 60 percent.

Coatings provided as herein described will reduce the porosity of granules having an "oil absorption" of 15 or 20 lbs. per ton to about 5–7 lbs. per ton or even lower. It will be noted, therefore, that we may thus provide a coating, and a method of applying the same, which seals up the pores of base granules almost completely, thus enhancing their value greatly for use in roofing because of relative freedom from blistering, sooting and staining difficulties normally encountered. Furthermore, this improvement is accomplished without resorting to the fused or glazed type of coatings. It is to be observed that other unfused types of coatings, such as heretofore employed, not only failed to reduce the absorptivity of base granules having a porosity of, say 15–20 lbs. per ton, but in most cases substantially increased the absorptivity thereof, as shown by the aforementioned test.

All dark or opaque rocks of nature which have been encountered or are known show a substantial absorptivity, viz: rarely ever as low as 10 lbs. per ton and frequently of about 20 lbs. per ton or higher. Exemplary "greystone" granules commonly show an absorptivity of 12–14 lbs. per ton, and sometimes about 16 lbs. per ton. Furthermore, if such granules are subjected to any very great amount of heating, there is a tendency for their porosity to increase further. This will further illustrate the significance of the result hereby attained, i. e. the high resistance to absorption of our finished coated granules, even though some heat is required in the coating operation.

While our coating procedure and the advantages thereof have been particularly illustrated hereinabove in connection with a type of organic pigments, especially phthalocyanines, it also has important utility in connection with certain other pigments, especially heat sensitive pigments, of which ferrite yellow and Guignet's green may be given as examples.

It will also be observed that the production of a surface coating, or granules, comprising an organic pigment in an inorganic bond or matrix and which furthermore has other advantageous properties, such as weather resistance, low absorptivity, etc., is an important result which we believe to be original with us and broadly new in this art.

While we have described and illustrated our invention and certain adaptations thereof in various details, it will be understood that this is exemplary only. All embodiments within the scope of this specification, including the appended claims, are comprehended.

What we claim is:

1. Artificially colored roofing granules comprising a mineral base granule coated with a phthalocyanine pigment bonded in a weather-resisting and bloom-resisting water-insoluble inorganic matrix, the thus pigmented coating being firmly bonded to surfaces of said base granule.

2. Artificially colored roofing granules comprising a mineral base coated with a bloom-resisting and water-insoluble in situ formed surface coating, said coating including a phthalocyanine pigment and being weather-resisting and firmly bonded to said mineral base granule.

3. A composite sheet body for roofing and like purposes comprising a plastic stratum and an adherent surfacing for the same consisting of colored coated granular material, individual granules of which are as defined in claim 2.

4. Artifically colored coated roofing granules comprising mineral base granules having an absorptivity as shown by the oil absorption test of 10–20 lbs. per ton, and an in situ formed, weather-resisting and water-insoluble colored coating on surfaces of said granules, the finished coated granules having an absorptivity substantially below that of said base granules and of the order of 5 lbs. per ton, as shown by said test, and said colored coating being further characterized in that it comprises an organic pigment of the phthalocyanine class disseminated in an inorganic silicate bond or matrix of substantially non-blooming character formed by insolubilizing a film of a soluble silicate in situ on surfaces of the said base granules at temperatures of 250°–600° F.

5. Artificially colored coated roofing granules comprising a mineral base granule coated with a substantially non-blooming and water-insoluble, in situ formed surface coating, said coating comprising an inorganic matrix pigmented with a phthalocyanine pigment combined with a finely divided inorganic material of high refractive index.

6. A composite sheet body for roofing and like purposes comprising a plastic stratum and an adherent surfacing for the same consisting of colored coated granular material, individual granules of which are as defined in claim 5.

7. Artificially colored coated roofing granules comprising a mineral base granule coated with a substantially non-blooming and water-insoluble, in situ formed surface coating, said coating comprising an inorganic matrix pigmented with a phthalocyanine pigment combined with a finely divided inorganic material of high refractive index, and the finished colored coated granules aforesaid being further characterized in that they have an absorptivity substantially lower than that of the uncoated mineral base granule aforesaid.

8. Artificially colored coated roofing granules comprising a mineral base coated with a substantially non-blooming and water-insoluble, in situ formed surface coating, said coating comprising a silicious matrix pigmented with an phthalocyanine pigment, the said phthalocyanine pigment being combined with a finely divided inorganic material of high refractive index.

9. Artificially colored roofing granules comprising a mineral base coated with a substantially non-blooming and water-insoluble, in situ formed surface coating, said coating comprising a matrix having disseminated therein a phthalocyanine pigment combined with an inorganic material of high refractive index, said matrix comprising a low temperature heat reaction product of an alumino-silicate, a fluo-silicate of sodium and a bivalent metal compound.

10. Artificially colored roofing granules comprising mineral base granules coated with a phthalocyanine green pigment and chromium oxide as an opaque base, bonded in a weather-resisting and bloom-resisting water-insoluble inorganic matrix comprising the reaction product of aqueous sodium silicate and aluminum fluoride, the thus pigmented coating being firmly bonded to surfaces of said base granules.

11. As a new article of manufacture mineral roofing granules comprising an opaque base surface-coated with a mixture of a phthalocyanine pigment and an opaque inorganic pigment dispersed in a substantially insoluble non-blooming inorganic silicate film resulting from the insolubilizing of sodium silicate.

12. As a new article of manufacture, artificially colored coated roofing granules comprising opaque, grey-colored base granules having an absorptivity, as measured by the oil absorption test, of 10–20 lbs. per ton, and a colored surface coating on said base granules, said surface coating being pigmented by a mixture comprising phthalocyanine blue and ultramarine blue disseminated in an inorganic bond or matrix, said inorganic bond comprising a low temperature heat reaction product of coating ingredients comprising an alkali metal silicate and at least one fluorine compound having a predetermined degree of insolubility and selected from the group consisting of silicofluorides and fluorides of aluminum, the finished coated granules having an absorptivity not greater than about 7 lbs. per ton and being weather-resisting, substantially water-insoluble and of strong blue color.

13. As a new article of manufacture, artificially colored coated roofing granules comprising opaque, grey-colored base granules having an absorptivity, as measured by the oil absorption test, of 10-20 lbs. per ton, and a colored surface coating on said base granules, said surface coating being pigmented by a mixture comprising phthalocyanine green and chromium oxide disseminated in an inorganic bond or matrix, said inorganic bond comprising a low temperature heat reaction product of coating ingredients comprising an alkali metal silicate and at least one fluorine compound having a predetermined degree of insolubility and selected from the group consisting of silicofluorides and fluorides of aluminum, the finished coated granules having an absorptivity not greater than about 7 lbs. per ton and being weather-resisting, substantially water-insoluble and of strong green color.

14. A composite sheet body for roofing and like purposes comprising a plastic stratum and an adherent surfacing for the same consisting of colored coated granular material, individual granules of which are as defined in claim 10.

15. A process for artificially coloring roofing granules comprising heating the granules to a moderate super-atmospheric temperature of about 90°-130° F., then mixing the granules with a sodium silicate solution, a phthalocyanine pigment and an opaque inorganic pigment, continuing the mixing and adding sodium silicofluoride and controlling the granules at a moderate super-atmospheric temperature, whereupon the said silicate is insolubilized to substantial extent and the coatings are dried, and restricting agitation during this insolubilizing and drying step, and then continuing the heating of the thus coated granules at temperatures above about 250° F. but below about 600° F., and then cooling the granules.

16. Artificially colored roofing granules comprising dense heat-resisting lithic base granules having an absorptivity as shown by the oil absorption test of about 10-20 lbs. per ton and weather-resistant, unfused, substantially non-blooming, light-fast bright colored surface coatings firmly bonded on said base granules, said surface coatings being produced in situ on surfaces of said granules by heat-reacting at temperatures of the order of 400° F. a coating composition including aqueous alkali metal silicate, an insolubilizing reactant therefor of inorganic character comprising siliceous and fluorine-bearing reactant material, and a coloring material comprising an organic phthalocyanine pigment, the finished coated granules having an absorptivity substantially below that of said base granules and not greater than approximately 5 lbs. per ton, as shown by said test.

17. An artificially colored roofing granule comprising a dense, heat-resisting mineral base granule having an absorptivity, as measured by the oil absorption test, of 10-20 pounds per ton, and a weather-resistant, heat reacted but unfused, substantially non-blooming, light-fast bright green colored surface coating firmly bonded to the surfaces of said base granule, said surface coating being pigmented by a mixture comprising phthalocyanine green pigment and chrome oxide, disseminated in an inorganic bond or matrix, said surface coating being produced in situ on surfaces of said granule by heat reacting at temperatures of 250°-600° F., a coating composition including said pigments in admixture with coating reactants comprising aqueous sodium silicate, a substantially insoluble metal fluoride and a Portland cement, the finished coated granule having a dense coating, which is bright colored and firmly bonded to the base granule, as aforesaid.

18. An artificially colored, roofing granule comprising a heat resisting mineral base granule of dense, opaque character and a weather-resisting, heat reacted but unfused, substantially non-blooming, light-fast, bright colored surface coating firmly bonded to surfaces of said base granule by heating and reacting in situ on surfaces of said granule at temperatures of the order of 400° F. the following coating composition in approximately the proportions as shown:

| | Pounds |
|---|---|
| Mineral base granules | 2,000 |
| Chromium oxide | 6.0 |
| Green phthalocyanine paste (20% solids) | 2.4 |
| Iron yellow | 0.1 |
| Titanium oxide | 1.0 |
| Aluminum fluoride | 11.4 |
| White Portland cement | 4.0 |
| Sodium silicofluoride | 5.7 |
| Sodium silicate solution (silica to soda ratio 2.85) | 50.0 | the resulting bright colored surface coated roofing granule being substantially free from any tendency to absorb moisture or to cause blistering of asphalt roofing, as well as being substantially non-blooming and weather-resisting, as aforesaid.

MAURICE E. BUZZELL.
GEORGE W. SWENSON.

REFERENCES CITED

The following references are of record in the file of this patent:

UNITED STATES PATENTS

| Number | Name | Date |
|---|---|---|
| 2,187,816 | Hartmann | Jan. 23, 1940 |
| Re. 19,372 | Walton | Nov. 13, 1934 |
| 1,689,842 | Rauschenberg | Oct. 30, 1928 |
| 1,876,629 | Denning | Sept. 13, 1932 |
| 2,057,677 | Gundlach | Oct. 20, 1936 |
| 2,114,692 | Ward | Apr. 19, 1938 |
| 2,142,540 | Veazey | Jan. 3, 1939 |